US011947283B2

(12) United States Patent
Okuno

(10) Patent No.: US 11,947,283 B2
(45) Date of Patent: Apr. 2, 2024

(54) DEVELOPER CONTAINER, IMAGE FORMING APPARATUS, AND METHOD OF REUSING DEVELOPER CONTAINER

(71) Applicant: KYOCERA Document Solutions Inc., Osaka (JP)

(72) Inventor: Yosuke Okuno, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/084,693

(22) Filed: Dec. 20, 2022

(65) Prior Publication Data

US 2023/0205112 A1 Jun. 29, 2023

(30) Foreign Application Priority Data

Dec. 28, 2021 (JP) .................................. 2021-214136

(51) Int. Cl.
*G03G 15/08* (2006.01)

(52) U.S. Cl.
CPC ..... *G03G 15/0881* (2013.01); *G03G 15/0867* (2013.01); *G03G 15/0874* (2013.01); *G03G 15/0894* (2013.01)

(58) Field of Classification Search
CPC ........... G03G 15/0867; G03G 15/0872; G03G 15/0874; G03G 15/0881; G03G 15/0894; G03G 2215/0682; Y02W 30/80
See application file for complete search history.

(56) References Cited

U.S. PATENT DOCUMENTS

| 4,998,140 A * | 3/1991 | Satou ................. G03G 15/0896 399/105 |
| 9,042,778 B2 * | 5/2015 | Saitoh ................ G03G 15/0874 141/10 |
| 2014/0376955 A1 * | 12/2014 | Takeuchi .......... G03G 15/0874 399/106 |
| 2021/0389695 A1 * | 12/2021 | Ikebata | |

FOREIGN PATENT DOCUMENTS

JP  2006-085124  3/2006

* cited by examiner

*Primary Examiner* — Sophia S Chen
(74) *Attorney, Agent, or Firm* — LEX IP MEISTER, PLLC

(57) ABSTRACT

A developer container is provided with a container body and a covering. The container body has a storage part for containing a developer and a discharge port used for discharging the developer contained in the storage part to outside of the container body. The covering covers a forming surface of a containing space of the developer in the storage part, and is provided so as to be drawable from the discharge port to outside of the container body.

8 Claims, 4 Drawing Sheets

DEVELOPER CONTAINER, IMAGE FORMING APPARATUS, AND METHOD OF REUSING DEVELOPER CONTAINER

INCORPORATION BY REFERENCE

This application is based upon and claims the benefit of priority from the corresponding Japanese Patent Application No. 2021-214136 filed on Dec. 28, 2021, the entire contents of which are incorporated herein by reference.

This disclosure relates to a developer container, an image forming apparatus, and a method of reusing a developer container.

BACKGROUND

Image forming apparatuses that form images using a developer such as toner are known. In this type of image forming apparatus, a developer container for containing the developer supplied to an image forming part for forming an image is detachably provided.

The developer container may be reused after use, that is, after the developer contained inside has been emptied. When the used developer container is reused, the inside of the container is cleaned to remove the developer remaining inside the developer container.

However, the remaining developer is sometimes stuck inside the developer container after use. In this case, it takes time and effort to clean the developer container.

SUMMARY

A developer container according to one aspect of the present disclosure is provided with a container body and a covering. The container body has a storage part for containing developer and a discharge port used for discharging the developer contained in the storage part to outside of the container body. The covering covers a forming surface of a containing space of the developer in the storage part, and is provided so as to be drawable from the discharge port to outside of the container body.

An image forming apparatus according to other aspects of the present disclosure is provided with the developer container and an image forming part. The image forming part forms an image using the developer supplied from the developer container.

A method of reusing developer container according to other aspects of the present disclosure includes a replacement step and a filling step. In the replacement step, the covering of the developer container is replaced. In the filling step, the developer is filled into the storage part of the developer container after the covering is replaced.

This summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure are described below with reference to the accompanying drawings. It should be noted that the following embodiment is an example that embodies this disclosure and is not intended to limit the technical scope of this disclosure.

<Configuration of Image Forming Apparatus 100>

Figure 1:
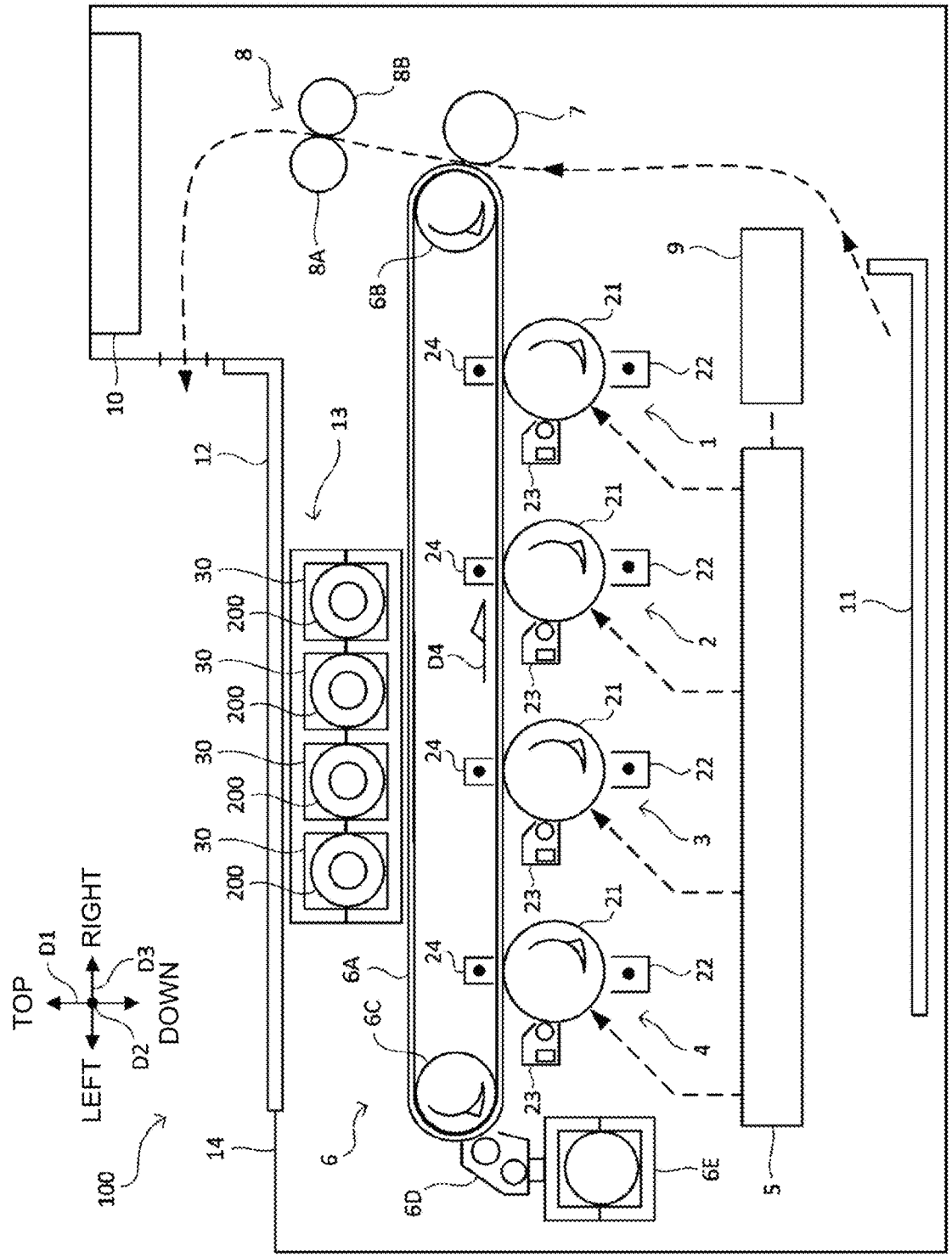
FIG. 1 shows a configuration of an image forming apparatus according to an embodiment of the present disclosure.

First, the configuration of an image forming apparatus 100 according to an embodiment of the present disclosure will be described with reference to FIG. 1. FIG. 1 is a cross-sectional view showing the configuration of the image forming apparatus 100.

In the following explanation, a vertical direction D1 is defined with reference to a state in which the image forming apparatus 100 is installed. Further, the side of the image forming apparatus 100 into which a toner container 200 is inserted is defined as the front side for the image forming apparatus 100 in an anteroposterior direction D2. In addition, a left-right direction D3 is defined with reference to a state in which the image forming apparatus 100 is viewed from the front side.

The image forming apparatus 100 is a device with at least a printing function. The image forming apparatus 100 prints an image on printing paper that is a sheet member using a developer containing toner (an example of a developer in this disclosure). For example, the image forming apparatus 100 is a color printer. The image forming apparatus 100 may be a monochrome printer, a fax machine, a photocopier or a multifunction machine.

The image forming apparatus 100 is a so-called tandem type color image forming apparatus. As shown in FIG. 1, the image forming apparatus 100 is equipped with a plurality of image forming parts 1 through 4, an optical scanner 5, an intermediate transfer unit 6, a secondary transfer device 7, a fixing device 8, a control part 9, an operation display part 10, a paper feed tray 11, a paper discharge tray 12, and a toner supply part 13. These components are attached to a housing 14 that makes up the external frame (not shown), the internal frame, etc., of the image forming apparatus 100.

The image forming parts 1 through 4 form toner images of different colors on each of the juxtaposed multiple photoreceptor drums 21 by a so-called electrophotographic method. The toner image is transferred so as to be sequentially superimposed on an intermediate transfer belt 6A during running (moving). As shown in FIG. 1, in the image forming parts 1 through 4, the image forming part 1 for black, the image forming part 2 for yellow, the image forming part 3 for cyan, and the image forming part 4 for magenta are arranged in a row in this order from the downstream side of a moving direction D4 of the intermediate transfer belt 6A.

Each of the image forming parts 1 through 4 is provided on the underside of the intermediate transfer belt 6A. Each of the image forming parts 1 through 4 is equipped with the photoreceptor drum 21 for carrying a toner image, a charging device 22, a developing device 23, a primary transfer device 24, etc. A surface of the photoreceptor drum 21 is charged by the charging device 22, and the surface of the charged photoreceptor drum 21 is exposed and scanned by the optical scanner 5. Thus, an electrostatic latent image is formed on the surface of the photoreceptor drum 21. The developing device 23 develops the electrostatic latent image by using toner. Then, the toner image on the photoreceptor drum 21 is transferred to the intermediate transfer belt 6A by the primary transfer device 24.

The intermediate transfer unit 6 has the intermediate transfer belt 6A, a drive roller 6B, a driven roller 6C, and a belt cleaning device 6D. The intermediate transfer belt 6A carries a toner image consisting of toner images of multiple colors (four colors in this embodiment). The intermediate transfer belt 6A is rotatably supported by the drive roller 6B and the driven roller 6C so that its surface can be moved while in contact with the surface of each photoreceptor drum 21. When the intermediate transfer belt 6A is driven to rotate, its surface passes between the photoreceptor drum 21 and the primary transfer device 24. At this time, the toner images of each color carried on the multiple photoreceptor drums 21 are sequentially transferred to the intermediate transfer belt 6A in such a way that they are superimposed.

The toner supply part 13 is provided above the intermediate transfer unit 6. The toner supply part 13 supplies toner of the corresponding color to each of the image forming parts 1 through 4. Each image forming part 1 through 4 forms an image using toner supplied from the toner supply part 13.

The secondary transfer device 7 transfers the toner image transferred to the intermediate transfer belt 6A to the printing paper conveyed from the paper feed tray 11. The printing paper on which the toner image is transferred is conveyed to the fixing device 8 by a conveyance part (not shown). The fixing device 8 has a heating roller 8A and a pressurizing roller 8B. The fixing device 8 conveys the printing paper on which the toner image is transferred, while applying heat and pressure to the printing paper. Thus, the toner image is melted and fixed to the printing paper. The printing paper on which the toner image is fixed is further conveyed downstream and discharged to the tray-shaped paper discharge tray 12 arranged above the intermediate transfer unit 6 to be held.

The belt cleaning device 6D removes and collects waste toner remaining on the surface of the intermediate transfer belt 6A, and discharges the collected waste toner into a waste toner container 6E.

The control part 9 controls the image forming apparatus 100 comprehensively. The control part 9 is equipped with a CPU, a ROM and a RAM. The CPU is a processor that executes various kinds of arithmetic processing. The ROM is a nonvolatile storage device in which information such as a control program for making the CPU execute various kinds of processing is stored in advance. The RAM is a volatile or nonvolatile storage device used as a temporary storage memory (work area) for various processes executed by the CPU. The CPU comprehensively controls the image forming apparatus 100 by executing various control programs prestored in the ROM.

The operation display part 10 has a display part such as a liquid crystal display that displays various kinds of information in response to a control instruction from the control part 9, and an operation part such as an operation key or a touch panel that inputs various kinds of information to the control part 9 in response to a user operation.

<Configuration of Toner Supply Part 13>

Figure 2:
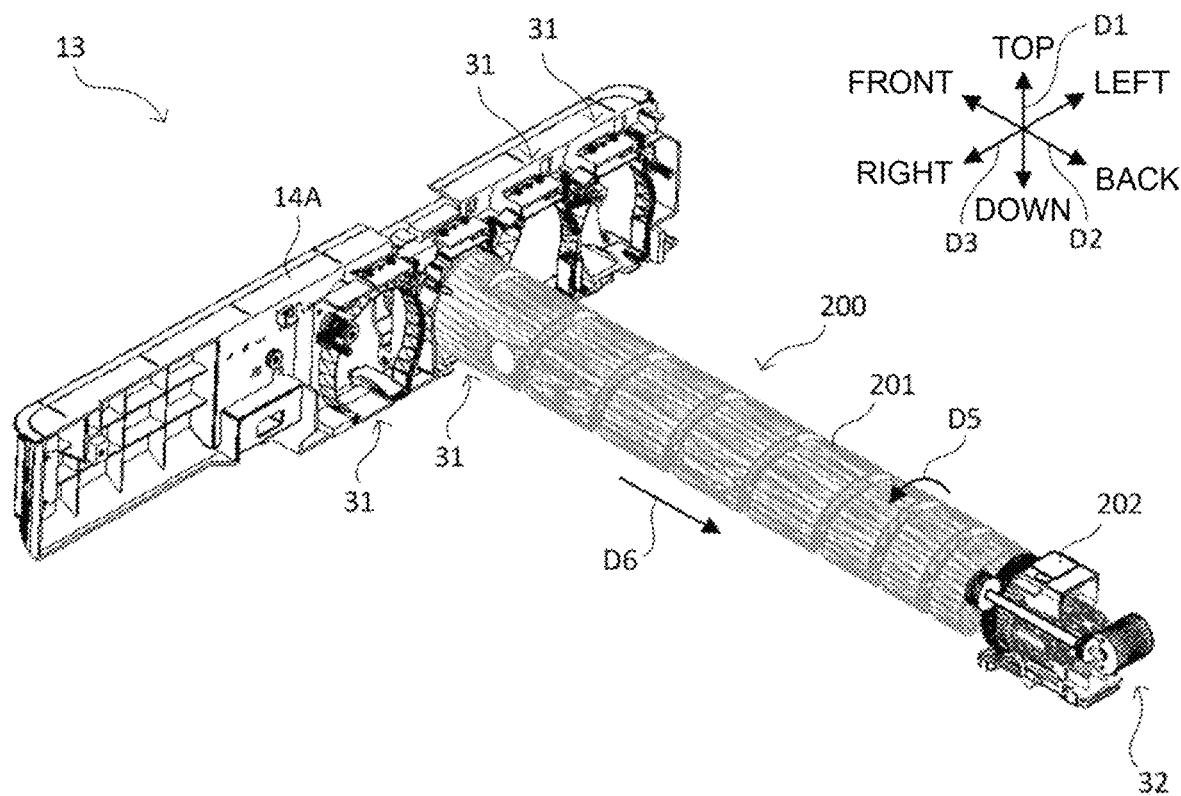
FIG. 2 shows a configuration of the toner supply part of the image forming apparatus according to an embodiment of the present disclosure.
Figure 3:
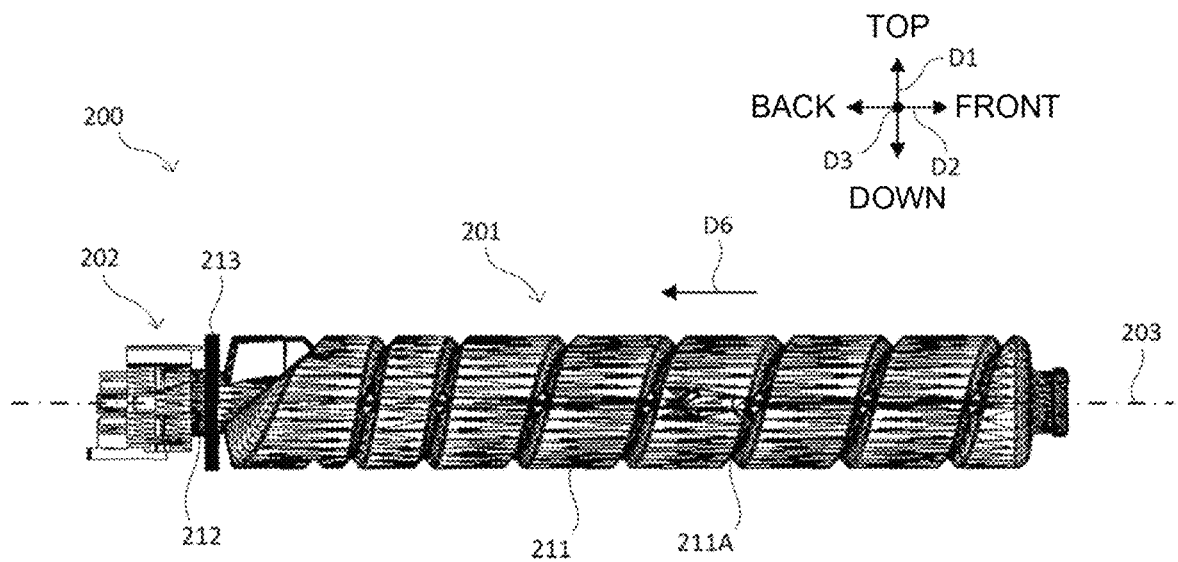
FIG. 3 is a diagram showing a configuration of a toner container according to an embodiment of the present disclosure.
Figure 4:
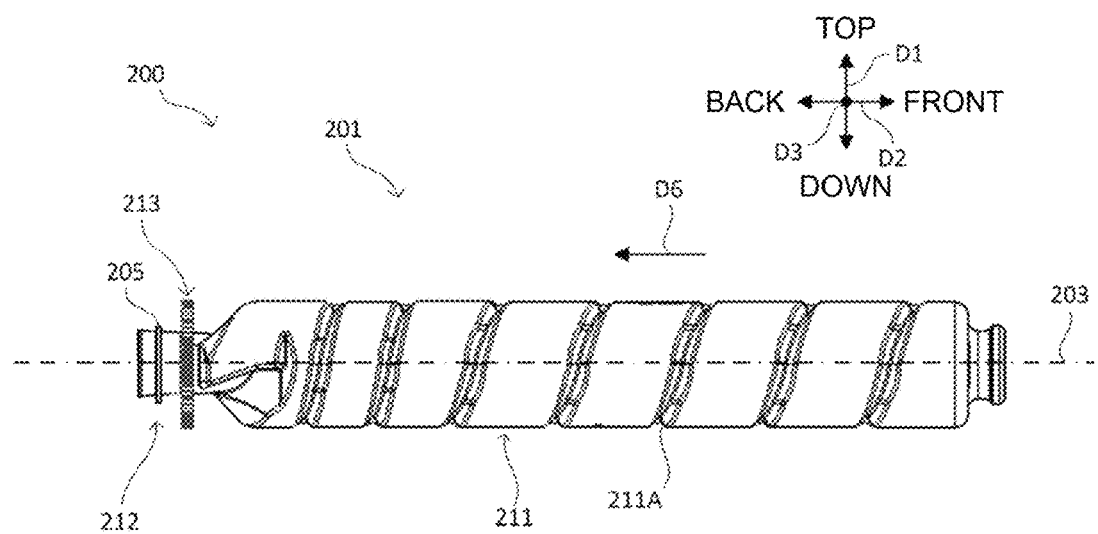
FIG. 4 shows a configuration of the container body of the toner container according to an embodiment of the present disclosure.
Figure 5:
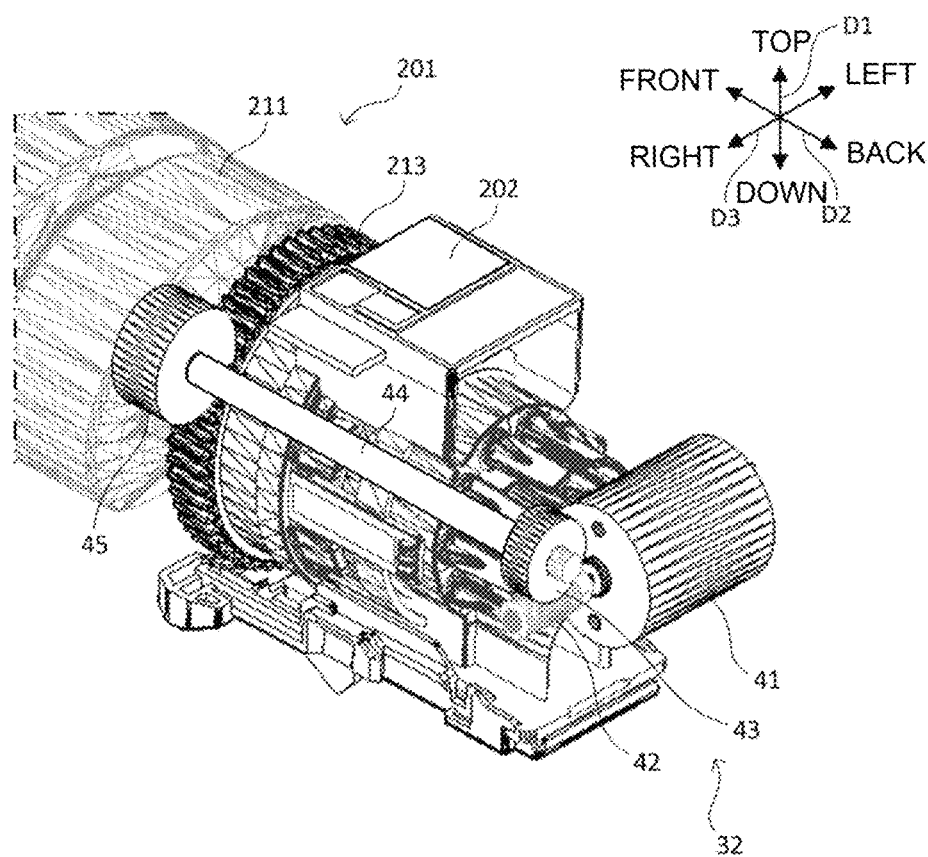
FIG. 5 is a diagram showing a configuration of a driving part of the image forming apparatus according to an embodiment of the present disclosure.

Next, the toner supply part 13 will be described with reference to FIGS. 1 to 5. FIG. 2 is a perspective view showing the configuration of the toner supply part 13. FIG. 3 is a side view showing the configuration of the toner container 200. FIG. 4 is a side view showing the configuration of a container body 201. FIG. 5 is a perspective view showing the configuration of a driving part 32.

As shown in FIG. 1, the toner supply part 13 includes the toner container 200 (an example of a developer container in this disclosure) corresponding to each of the colors black, yellow, cyan and magenta, and a mounting portion 30 to which each of the toner containers 200 is mounted.

As shown in FIG. 2, the toner supply part 13 is equipped with an opening 31 and a driving part 32.

The toner container 200 stores toner to be supplied to the developing device 23. In this embodiment, 4 toner containers 200 corresponding to each color of black, yellow, cyan and magenta are provided in the toner supply part 13. In FIG. 2, only the yellow toner container 200 is shown, and the toner containers 200 for the other colors are not shown. The toner containers 200 of respective colors have a common configuration except that the black toner container 200 has a larger outer diameter than the other color toner containers 200. Hereafter, unless otherwise noted, the yellow toner container 200 shown in FIG. 2 and the configuration corresponding to the yellow toner container 200 will be described.

As shown in FIG. 3, the toner container 200 includes the container body 201 and a cap 202.

As shown in FIG. 4, the container body 201 is formed in a cylindrical shape and is rotated in a rotation direction D5 (see FIG. 2) along a circumferential direction to convey the toner contained inside to a conveyance direction D6 (see FIGS. 2 to 4) along a rotation shaft 203 (see FIGS. 3 and 4). The rotation shaft 203 is a shaft line passing through the center of the container body 201. The conveyance direction D6 is a direction from the front to the rear (back) of the image forming apparatus 100. The container body 201 is integrally formed by a synthetic resin such as PET (polyethylene terephthalate).

As shown in FIG. 4, the container body 201 includes a storage part 211, a discharge port 212, and a gear part 213.

The storage part 211 stores toner for replenishment. The storage part 211 is formed in a cylindrical shape concentric with the rotation shaft 203 (see FIG. 4) of the toner container 200, and is long along the conveyance direction D6. The storage part 211 is formed in a bottomed cylindrical shape with a bottom on the upstream side of the conveyance direction D6. The storage part 211 is formed in a shape with a narrow end toward the downstream side of the conveyance direction D6 at the downstream side of the conveyance direction D6.

The inner periphery of the storage part 211 is provided with a protrusion 211A (see FIG. 4) spirally formed along the rotation shaft 203. The protrusion 211A projects from the inner circumferential surface of the storage part 211 toward the rotation shaft 203. FIG. 4 shows a spiral recess formed in the outer periphery of the storage part 211 corresponding to the protrusion 211A.

By being provided therein with the spiral protrusion 211A, the storage part 211 can convey the toner contained inside to the conveyance direction D6 (see FIG. 4) along the rotation shaft 203 (an example of the axis line in this disclosure) by rotating around the rotation shaft 203 in the rotation direction D5 (see FIG. 2).

The discharge port 212 is used for discharging the toner contained in the storage part 211 to outside of the container body 201. The discharge port 212 is provided at the downstream end of the container body 201 in the conveyance direction D6. The discharge port 212 is formed to project from the downstream end of the storage part 211 in the conveyance direction D6 to the downstream of the conveyance direction D6 in a cylindrical shape concentric with the rotation shaft 203. The discharge port 212 opens toward the conveyance direction D6. Toner inside the container body 201 is discharged from the discharge port 212 to the conveyance direction D6. The conveyance direction D6 is an example of the opening direction in the present disclosure.

The gear part 213 is provided on the outer periphery of the discharge port 212 formed in a cylindrical shape. The gear part 213 receives rotational driving force supplied from the driving part 32. Each configuration of the container body 201 including the gear part 213 is integrally formed. Therefore, when the gear part 213 receives rotational driving force supplied from the driving part 32, the container body 201 rotates around the rotation shaft 203.

The cap 202 is attached to the rear end of the container body 201, that is, attached to the discharge port 212 (see FIG. 3). The cap 202 is formed in a cylindrical shape with one direction open and is sized to cover a part of the discharge port 212 formed in a cylindrical shape. The cap 202 rotatably supports the discharge port 212 formed in a cylindrical shape.

The cap 202 guides the toner discharged from the discharge port 212 towards downward, at the downstream side of the discharge port 212 in the conveyance direction D6. A guide space is formed inside the cap 202 to guide the toner discharged from the discharge port 212 downward. At the bottom of the inner periphery of the cap 202, an outlet is formed where the toner is discharged to outside of the cap 202.

The toner container 200 is mounted on the mounting portion 30 (see FIG. 1). The mounting portion 30 is provided corresponding to each of the toner containers 200. The mounting portion 30 forms a storage space for storing the toner container 200 extending in the anteroposterior direction D2 inside the housing 14. The toner container 200 is mounted on the mounting portion 30 with the rotation shaft 203 in an attitude along the horizontal plane.

The opening 31 is provided on a side surface of the housing 14 of the image forming apparatus 100. Specifically, the opening 31 is provided at the front of the housing 14. On the front of the housing 14, a frame member 14A (see FIG. 2) is provided, which is long in the left-right direction D3. The opening 31 is formed in the frame member 14A. The openings 31 are provided corresponding to respective mounting portions 30. The opening 31 is located at the front end of the mounting portion 30 and leads to the mounting portion 30. The toner container 200 is inserted into the opening 31.

The driving part 32 rotates the container body 201 of the toner container 200. The driving parts 32 are provided corresponding to each of the mounting portions 30. The driving part 32 is provided at the rear end of the mounting portion 30 (see FIG. 2).

As shown in FIG. 5, the driving part 32 includes a motor 41, a first gear 42, a second gear 43, a shaft 44, and a third gear 45. The first gear 42 is fixed to the drive shaft of the motor 41. The second gear 43 is fixed to one end of the shaft 44 and meshes with the first gear 42. The shaft 44 is rotatably supported by bearings (not shown) inside the housing 14. The third gear 45 is fixed to the other end of the shaft 44 and meshes with the gear part 213 of the container body 201.

In the driving part 32, the rotational driving force generated by the motor 41 is transmitted to the gear part 213 via the first gear 42, the second gear 43, the shaft 44, and the third gear 45. Thus, the container body 201 rotates around the rotation shaft 203.

By the way, the toner container 200 is reused after use, that is, after the toner stored inside is empty and the toner container 200 is removed from the mounting portion 30. When the used toner container 200 is reused, the inside of the container is cleaned to remove the toner remaining inside the container.

Here, the remaining toner may adhere to the inside of the toner container 200 after use. In this case, it takes time and effort to clean the toner container 200.

To counter such a situation, according to an embodiment of the present disclosure, it is possible to reduce the labor of cleaning the inside of the toner container 200 as described below.

<Configuration of Toner Container 200>

Figure 6:
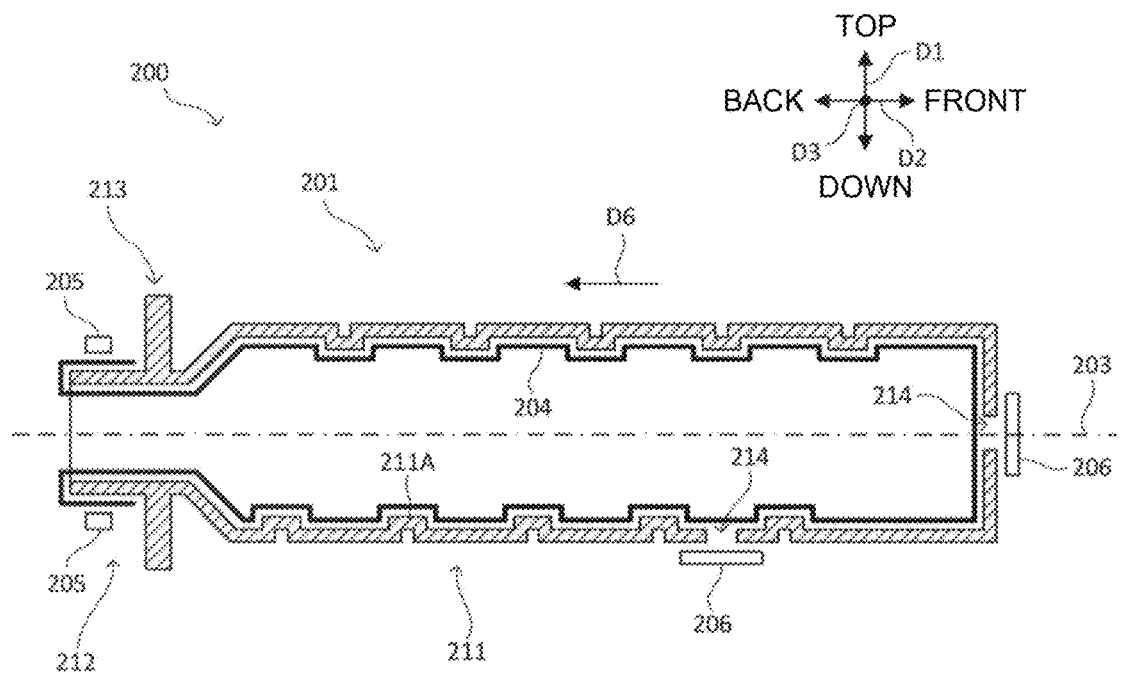
FIG. 6 shows a configuration of the toner container according to an embodiment of the present disclosure.

Hereafter, referring to FIGS. 2 to 4 and FIG. 6, the toner container 200 according to an embodiment of the present disclosure is described in more detail. FIG. 6 is a cross-sectional view showing the configuration of the toner container 200. In FIG. 6, the illustration of the cap 202 is omitted. Also, in FIG. 6, the first covering 204 is shown by a thick solid line.

As shown in FIG. 6, the toner container 200 has the first covering 204, a sealing part 205, and a blocking part 206. Also, as shown in FIG. 6, the container body 201 has a vent hole 214.

The first covering 204 covers a forming surface of the toner containing space in the storage part 211. The first covering 204 is provided so as to be drawable from the discharge port 212 to outside of the container body 201. The first covering 204 is an example of a covering in the present disclosure.

The first covering 204 covers the whole of the forming surface. Specifically, the first covering 204 is formed in a shape of a bag extending along the conveyance direction D6 across the discharge port 212. The bottom of the bag-shaped first covering 204 is arranged opposite to the upstream end of the conveyance direction D6 in the storage part 211. The opening of the bag-shaped first covering 204 is folded back to the upstream side of the conveyance direction D6 outside the discharge port 212 and is arranged on the outer periphery of the cylindrical discharge port 212.

By covering the entire forming surface with the first covering 204, it is possible to remove the toner remaining inside the toner container 200 after use, that is, to clean the toner container 200 after use, simply by drawing the first covering 204 from the discharge port 212 to outside of the container body 201. The first covering 204 may cover a part of the forming surface.

For example, the first covering 204 is formed of a resin film having a predetermined thickness. For example, the first covering 204 is a seamless film made of PE (polyethylene) or PET (polyethylene terephthalate) with a thickness of 0.10 mm (millimeters) or less.

The sealing part 205 seals between the discharge port 212 and the first covering 204.

Specifically, the sealing part 205 seals between the outer periphery of the discharge port 212 formed in a cylindrical shape and the first covering 204. As shown in FIG. 4, the sealing part 205 is formed in a ring shape along the outer periphery of the discharge port 212.

For example, the sealing part 205 is a member having elasticity such as synthetic rubber. The sealing part 205 may be an adhesive tape for fixing the opening of the bag-shaped first covering 204 to the outer periphery of the discharge port 212. The sealing part 205 may be composed of a groove formed along the rotation direction D5 (see FIG. 2) at the outer periphery of the discharge port 212, an elastic member provided at the bottom of the groove, and a rigid ring-shaped member for press-connecting the first covering 204 with the elastic member.

The sealing part 205 may seal between the inner periphery or edge of the discharge port 212 formed in a cylindrical shape and the first covering 204.

The vent holes 214 are provided through the forming surface and are used to move air to outside of the container body 201. The vent hole 214 forms a through-hole extending along a direction perpendicular or intersecting the forming surface.

Specifically, the vent hole 214 is used to intake air from outside of the container body 201. For example, as shown in FIG. 6, the vent hole 214 is provided at both the upstream end of the conveyance direction D6 in the storage part 211 and the outer periphery along the rotation direction D5 (see FIG. 2). The vent hole 214 may be provided either at the upstream end of the conveyance direction D6 in the storage part 211 or at the outer periphery along the rotation direction D5. The number of vent hole 214 may be one or more.

The vent hole 214 may be used to exhaust air to outside of the container body 201.

The blocking part 206 blocks the vent hole 214.

Specifically, the blocking part 206 blocks the vent hole 214 at the outer periphery of the cylindrical storage part 211. For example, the blocking part 206 is a sealing member affixed to the outer periphery of the storage part 211. The blocking part 206 may be a backflow prevention valve that permits air movement in the vent hole 214 towards outside the storage part 211 and prohibits air movement towards inside the storage part 211.

Next, a method of manufacturing the toner container 200 will be described with reference to FIG. 6.

First, the first covering 204 is inserted into the empty container body 201 so that the bottom of the bag-shaped first covering 204 faces the upstream end of the conveyance direction D6 in the storage part 211. Next, the opening of the bag-shaped first covering 204 is folded back to the upstream side of the conveyance direction D6 outside the discharge port 212 so that the opening is positioned at the outer periphery of the cylindrical discharge port 212.

Next, the sealing part 205 is attached to the outer periphery of the discharge port 212, and the space between the outer periphery and the first covering 204 is sealed.

Then, an air intake device is connected to the vent hole 214, and the air between the forming surface of the storage part 211 and the first covering 204 is sucked using the air intake device. As a result, the forming surface of the storage part 211 and the first covering 204 come into close contact. Therefore, in comparison with the case where air exists between the forming surface of the storage part 211 and the first covering 204, it is possible to suppress the decrease of the toner containing amount by providing the first covering 204 inside the container body 201 and the decrease of the toner carrying function by the protrusion 211A.

If the thickness of the first covering 204 exceeds 0.10 mm, there is a risk that the forming surface of the storage part 211 and the first covering 204 do not adhere closely. Therefore, it is desirable that the thickness of the first covering 204 is 0.10 mm or less.

Next, the blocking part 206 as a sealing member is attached to the outer periphery of the storage part 211 to block the vent hole 214. This seals the space between the forming surface of the storage part 211 and the first covering 204. Therefore, the adhesion between the forming surface of the storage part 211 and the first covering 204 is maintained.

Next, the container body 201 is filled with toner.

Then, the cap 202 (see FIG. 3) is attached to the discharge port 212 of the container body 201. This completes the toner container 200.

Next, the method of cleaning the toner container 200 after use will be described with reference to FIG. 6.

First, the cap 202 (see FIG. 3) is removed from the discharge port 212 of the container body 201.

Next, the blocking part 206 attached to the outer periphery of the storage part 211 is removed from the outer periphery to open the vent hole 214. Thus, the adhesion between the forming surface of the storage part 211 and the first covering 204 is eliminated. Instead of removing the blocking part 206 from the outer periphery of the storage part 211, the sealing part 205 may be removed from the outer periphery of the discharge port 212.

Next, the sealing part 205 attached to the outer periphery of the discharge port 212 is removed from the outer periphery, and the opening of the bag-shaped first covering 204 is stretched to the downstream side in the conveyance direction D6. As a result, the opening of the bag-shaped first covering 204 is arranged downstream of the discharge port 212 in the conveyance direction D6, so that the first covering 204 can be easily drawn from the container body 201.

Then, the first covering 204 is pulled out to outside of the container body 201. Thus, the toner remaining inside the toner container 200 after use is pulled out to outside of the container body 201 together with the first covering 204, and the cleaning of the toner container 200 after use is completed. Therefore, the toner container 200 can be reused.

Here, in the toner container 200 after use, the surface quality of the forming surface of the storage part 211 may be reduced due to aging deterioration. That is, the surface of the forming surface may be rough. Therefore, if the inner surface of the cleaned toner container 200 is filled with toner without covering the inner surface of the toner container 200 with the first covering 204, the toner carrying function by the protrusion 211A may be degraded.

Therefore, it is desirable that the inner surface of the cleaned toner container 200 is covered with the first covering 204, and then the toner container 200 is filled with toner. That is, it is desirable that, after executing the replacement step of replacing the first covering 204 of the toner container 200 after use, the filling step is executed for filling the storage part 211 of the toner container 200 with toner after the first covering 204 is replaced. By executing the filling step after executing the replacement step, it is possible to suppress the deterioration of the toner carrying function by the protrusion 211A, which is attributed to the deterioration of the surface quality of the forming surface. In addition, the toner container 200 can be reused multiple times.

Here, the above replacement step includes a cleaning step of cleaning the toner container 200 after use and a covering step of covering the inner surface of the toner container 200 after cleaning, with a first covering 204. The cleaning step includes each procedure of a cleaning method of the toner container 200 after use described above. In addition, the covering step includes each procedure up to just before toner filling in the manufacturing method of the toner container 200 described above. The method of reusing the toner container 200 including the above replacement step and the above filling step is an example of the method of reusing the developer container in this disclosure.

In this way, the toner container 200 covers the above forming surface of the toner containing space in the storage part 211 and is provided with the first covering 204 which can be pulled out from the discharge port 212 to outside of the container body 201. As a result, it is possible to remove part or all of the toner remaining inside the toner container 200 after use from the inside of the container by simply pulling out the first covering 204 from the discharge port 212 to outside of the container body 201. Therefore, it is possible to reduce the labor of cleaning the inside of the container.

In the toner container 200, the storage part 211 is long in the conveyance direction D6, which is the opening direction of the discharge port 212, and the first covering 204 is formed in a shape of a bag extending along the conveyance direction D6 across the discharge port 212. Thus, it is possible to cover the entire surface of the forming surface using a member of a simple shape.

OTHER EMBODIMENTS

Figure 7:
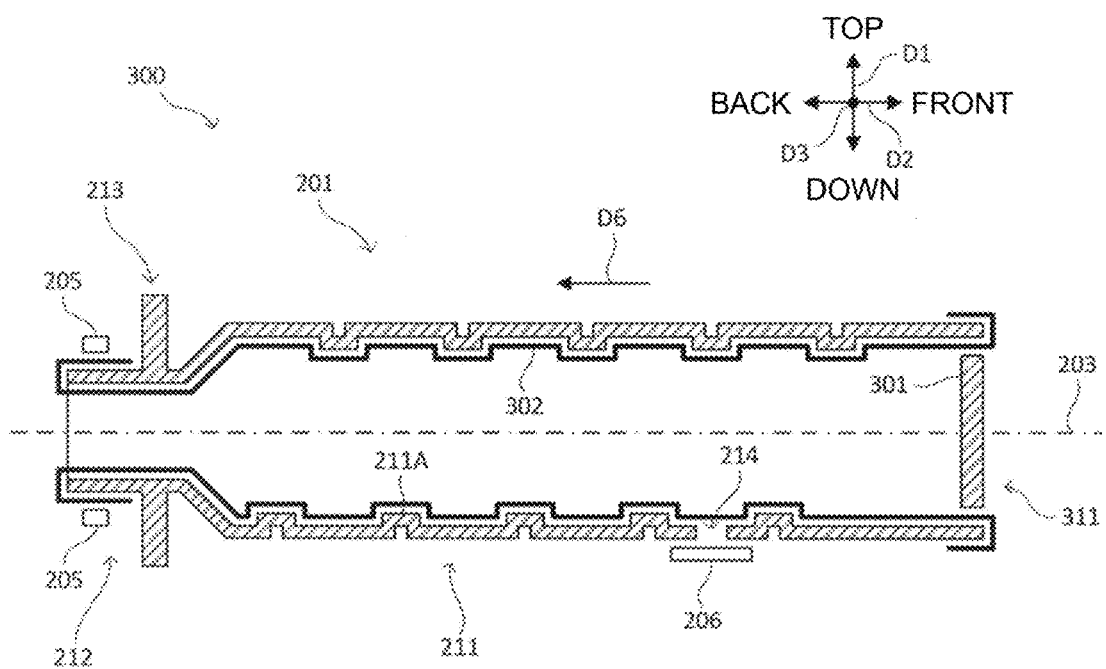
FIG. 7 shows a configuration of the toner container according to another embodiment of the present disclosure.

A toner container 300 according to another embodiment of the present disclosure will be described below with reference to FIGS. 6 and 7. FIG. 7 is a cross-sectional view showing the configuration of the toner container 300.

The toner container 300 (another example of developer container in the present disclosure) is different from the toner container 200 (see FIG. 6) in having a container opening 311 and a lid 301 shown in FIG. 7. The toner container 300 is different from the toner container 200 in having a second covering 302 (see FIG. 7) instead of a first covering 204 (see FIG. 6). Other points are common between the toner container 300 and the toner container 200. Only a configuration of the toner container 300, which is different from that of the toner container 200, will be described below.

A container opening 311 opens from the upstream end of the conveyance direction D6 in the storage part 211 toward the upstream side of the conveyance direction D6. The container opening 311 is provided in the container body 201. The container opening 311 is an example of an opening in the present disclosure.

For example, the container opening 311 is the upstream end of the conveyance direction D6 in the bottomless cylindrical storage part 211. It can also be said that the container opening 311 is formed to project from the upstream end of the conveyance direction D6 in the storage part 211 to the upstream side of the conveyance direction D6 in a cylindrical shape concentric with the rotation shaft 203. The size of the opening of the container opening 311 is the same as the inner periphery of the storage part 211. The size of the opening of the container opening 311 may be smaller than the inner periphery of the storage part 211.

A second covering 302 covers the forming surface of the storage part 211. The second covering 302 is provided so as to be drawable from the discharge port 212 to outside of the container body 201. The second covering 302 is another example of a covering in the present disclosure.

The second covering 302 covers the whole of the forming surface. Specifically, the second covering 302 is formed in a cylindrical shape extending along the conveyance direction D6 across the discharge port 212 and the container opening 311. The upstream end of the conveyance direction D6 in the cylindrical second covering 302 is folded back to the downstream side of the conveyance direction D6 outside the container opening 311 and is arranged in the outer periphery of the cylindrical container opening 311. Further, the downstream end of the conveyance direction D6 in the cylindrical second covering 302 is folded back to the upstream side of the conveyance direction D6 outside the discharge port 212, and is arranged on the outer periphery of the cylindrical discharge port 212.

For example, the second covering 302 is formed of a resin film having a predetermined thickness, similar to the first covering 204.

The lid 301 closes the container opening 311 and seals between the container opening 311 and the second covering 302.

For example, the lid 301 is a disk-shaped member that can be inserted into the container opening 311 (see FIG. 7). In this case, the lid 301 seals between the inner periphery of the cylindrical container opening 311 and the second covering 302. The lid 301 may have a recess into which the outer periphery of the cylindrical container opening 311 can be inserted. In this case, the lid 301 may seal between the edge or outer periphery of the cylindrical container opening 311 and the second covering 302. The lid 301 may also have a groove into which the edge of the cylindrical container opening 311 can be inserted.

Next, a method of manufacturing the toner container 300 will be described with reference to FIG. 7.

First, the cylindrical second covering 302 is inserted into the empty container body 201 so that the second covering 302 extends along the conveyance direction D6 across the discharge port 212 and the container opening 311. Then, so that the upstream end of the conveyance direction D6 in the cylindrical second covering 302 is positioned at the outer periphery of the cylindrical container opening 311, the end is folded back to the downstream side of the conveyance direction D6 outside the container opening 311. In addition, the end of the cylindrical second covering 302 on the downstream side of the conveyance direction D6 is folded back to the upstream side of the conveyance direction D6 outside the discharge port 212 so that the end is positioned at the outer periphery of the cylindrically formed discharge port 212.

The lid 301 is then attached to the container opening 311 to seal between the container opening 311 and the second covering 302. In addition, the sealing part 205 is attached to the outer periphery of the discharge port 212 to seal between the outer periphery and the second covering 302.

Then, the air intake device is connected to the vent hole 214, and the air between the forming surface of the storage part 211 and the second covering 302 is sucked using the air intake device. As a result, the forming surface of the storage part 211 and the second covering 302 come into close contact.

Next, the blocking part 206 as a sealing member, is attached to the outer periphery of the storage part 211 to block the vent hole 214. This seals the space between the forming surface of the storage part 211 and the second covering 302.

Next, the container body 201 is filled with toner.

Then, the cap 202 (see FIG. 3) is attached to the discharge port 212 of the container body 201. This completes the toner container 300.

Thus, in the toner container 300, the storage part 211 is long in the conveyance direction D6, which is the opening direction of the discharge port 212, the container body 201 has the container opening 311 that opens from the upstream end of the conveyance direction D6 in the storage part 211 to the upstream side of the conveyance direction D6, and the second covering 302 is formed in a cylindrical shape that extends along the conveyance direction D6 across the discharge port 212 and the container opening 311. Thus, it is possible to cover all of the above forming surfaces using a member with a further simpler shape than the toner container 200.

The present disclosure may also be applied to a toner container with a carrying member used to carry toner inside.

The present disclosure may also be applied to waste toner containers 6E.

That is, the developer container in the present disclosure may be a waste toner container 6E.

Moreover, the developer in this disclosure need not be limited to toner. For example, the developer in this disclosure may be ink. That is, the disclosure may be applied to an image forming apparatus that forms an image by inkjet method.

What is claimed is:

1. A developer container comprising:
   a container body having a storage part for containing developer and a discharge port used for discharging the developer contained in the storage part to outside of the container body; and
   a covering that covers a forming surface of a containing space of the developer in the storage part and is provided so as to be drawable from the discharge port to outside of the container body,
   wherein the covering covers the entire forming surface.

2. The developer container according to claim 1, wherein
   the storage part is long in an opening direction of the discharge port, and
   the covering is formed in a shape of a bag extending along the opening direction across the discharge port.

3. The developer container according to claim 2, comprising:
   a sealing part that seals between the discharge port and the covering;
   at least one vent hole provided on the forming surface and used for the movement of air to outside of the container body; and
   a blocking part that blocks the at least one vent hole.

4. The developer container according to claim 2, wherein
   the storage part is formed in a cylindrical shape and is rotated around an axis line to carry the developer contained inside in the opening direction.

5. The developer container according to claim 1, wherein
   the storage part is long in an opening direction of the discharge port,
   the container body has an opening that opens from an upstream end of the storage part in the opening direction to an upstream side in the opening direction,
   the covering is formed in a cylindrical shape extending in the opening direction across the discharge port and the opening, and
   the developer container has a lid that closes the opening and seals between the opening and the covering.

6. The developer container according to claim 1, wherein the covering is formed by a resin film.

7. An image forming apparatus comprising:
   the developer container of claim 1; and
   an image forming part that forms an image by using the developer provided from the developer container.

8. A method of reusing a developer container comprising:
   a replacement step of replacing the covering of the developer container of claim 1, and
   a filling step of filling, with the developer, the storage part of the developer container after the covering is replaced.

* * * * *